United States Patent
Avny et al.

(10) Patent No.: US 8,062,178 B2
(45) Date of Patent: Nov. 22, 2011

(54) TEMPERATURE CONTROL OF DUAL INPUT CLUTCH TRANSMISSION

(75) Inventors: Eli Avny, Ypsilanti, MI (US); Steven G. Thomas, Bloomfield Hills, MI (US); Piero Aversa, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 12/265,283

(22) Filed: Nov. 5, 2008

(65) Prior Publication Data
US 2010/0113216 A1    May 6, 2010

(51) Int. Cl.
*F16H 59/00* (2006.01)
*F16D 13/00* (2006.01)

(52) U.S. Cl. ........................ 477/98; 192/113.2
(58) Field of Classification Search ................ 477/98; 74/331, 336 R, 337; 192/70.12, 113.2; 188/71.6, 188/264 A
See application file for complete search history.

(56) References Cited

U.S. PATENT DOCUMENTS

| | | | |
|---|---|---|---|
| 2,198,792 A | 4/1940 | Schjolin | |
| 2,205,629 A | 6/1940 | Peterson | |
| 2,310,203 A | 2/1943 | Banker | |
| 2,777,965 A | 1/1957 | Winther | |
| 3,661,238 A | 5/1972 | Davies | |
| 4,294,343 A | 10/1981 | Reh | |
| 4,382,497 A | 5/1983 | Sakai et al. | |
| 4,561,522 A | 12/1985 | Dayen | |
| 4,657,128 A | 4/1987 | Fujito et al. | |
| 4,721,195 A | 1/1988 | Majima | |
| 4,846,315 A * | 7/1989 | Dayen | 188/264 A |
| 4,923,043 A | 5/1990 | Okuno | |
| 5,857,547 A | 1/1999 | Dequesnes | |
| 5,996,757 A | 12/1999 | Hofmann et al. | |
| 6,482,123 B2 * | 11/2002 | Steeby | 477/98 |
| 6,715,597 B1 * | 4/2004 | Buchanan et al. | 192/70.12 |
| 7,063,196 B2 | 6/2006 | Wakabayashi et al. | |
| 7,314,429 B2 * | 1/2008 | Reibold et al. | 477/177 |
| 2001/0025759 A1 | 10/2001 | Sarar | |
| 2002/0088288 A1 * | 7/2002 | Bowen | 74/331 |
| 2003/0036457 A1 * | 2/2003 | Wu et al. | 477/98 |
| 2005/0126877 A1 | 6/2005 | Schneider et al. | |
| 2009/0152055 A1 * | 6/2009 | Cox | 188/71.6 |

FOREIGN PATENT DOCUMENTS

| | | |
|---|---|---|
| CN | 1920318 A | 9/2006 |
| GB | 2097873 | 11/1982 |
| JP | 59013129 | 1/1984 |
| JP | 59067144 A * | 4/1984 |
| JP | 61235219 | 10/1986 |
| JP | 62132038 | 6/1987 |
| JP | 03189419 | 8/1991 |
| JP | 04029622 | 1/1992 |
| JP | 05106642 | 4/1993 |
| JP | 07310755 | 11/1995 |
| JP | 11254981 | 9/1999 |

* cited by examiner

*Primary Examiner* — Roger Pang
(74) *Attorney, Agent, or Firm* — David B. Kelley; MacMillan, Sobanski & Todd, LLC

(57) ABSTRACT

A system for controlling temperature of a transmission clutch includes a housing containing the clutch, a fan for circulating air through the housing and over the clutch, and a controller configured to determine an inferred temperature at a reference surface on the clutch and to actuate the fan in response to the inferred temperature.

9 Claims, 4 Drawing Sheets

TEMPERATURE CONTROL OF DUAL INPUT CLUTCH TRANSMISSION

BACKGROUND OF THE INVENTION

1. Field of the Invention

This invention relates generally to a multiple speed powershift transmission for a motor vehicle. In particular, the invention pertains to controlling temperature of the input clutches for the transmission.

2. Description of the Prior Art

A powershift transmission is a geared mechanism producing multiple gear ratios in forward drive and reverse drive and having two input clutches, which connect a power source, such as an engine or electric motor, to two transmission input shafts.

The transmission incorporates gearing arranged in a dual layshaft configuration between the transmission input and its output. One input clutch transmits torque between the input and a first layshaft associated with first, second, fifth and sixth gears; the other input clutch transmits torque between the transmission input and a second layshaft associated with third, fourth and reverse gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

Temperature is a critical factor that determines the length of the service life of a dry powershift transmission in which each input clutch is a dry clutch. A principal failure mode is attributable to high clutch temperature, which is a durability predictor for the dual clutch of the powershift transmission.

Two clutch locations, where the temperature and degradation rate are relevant, include the clutch surface temperature, and a reference point used for temperature monitoring, which is located preferably 4.0 mm under the clutch contact surface. Although these two locations are critical to clutch durability, no direct, real time temperature feedback is available for alerting the driver of potentially abusive harmful usage because thermocouple access and the transmission of data from a thermocouple on a rotating member present technical difficulties. Additionally, when a vehicle equipped with a dual clutch powershift transmission is presented for service with clutch problems, it is difficult to trace the history of the particular problem to its root cause, and to identify possible usage conditions and anomalies.

A need exists in the industry for a mechanism to alert the operator of a vehicle with a dual clutch powershift transmission of potentially abusive conditions, combined with temperature integration for application severity and history monitoring and cumulative wear as reflected by temperature feedback.

SUMMARY OF THE INVENTION

A system for controlling temperature of a transmission clutch includes a housing containing the clutch, a fan for circulating air through the housing and over the clutch, and a controller configured to determine an inferred temperature at a reference surface on the clutch and to actuate the fan in response to the inferred temperature.

The invention contemplates a method for controlling the temperature of a clutch. A housing is provided containing a dual input clutch. A fan is provided for circulating air through the housing both internally and externally for forced convection. An inferred temperature on the clutch within the housing is determining and the fan is actuated in response to the inferred temperature.

The system and method provide a mechanism to modulate temperature on the input clutch of a dual clutch powershift transmission. The temperature of each clutch is determined without requiring that a temperature sensor be placed on a surface of the clutch, which is located in a bell housing to which access is difficult to attain.

The invention avoids high clutch temperature at various vehicle operating conditions, thereby lengthening the service life of the input clutches and improving their operation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
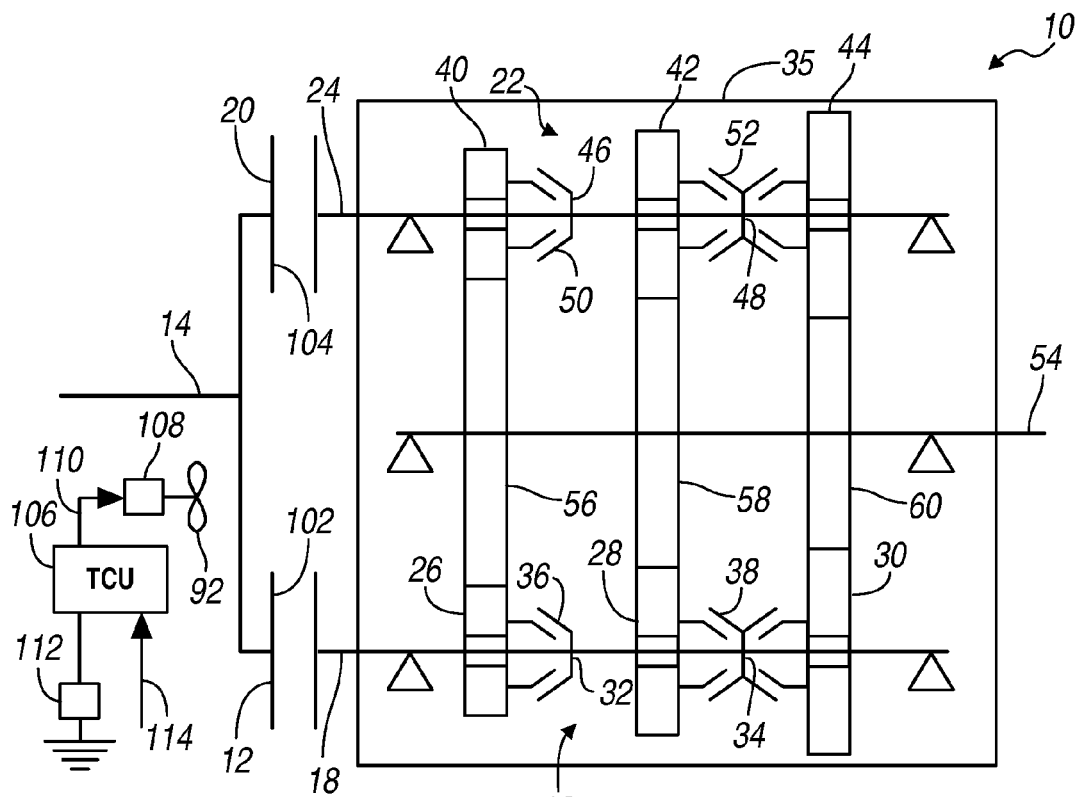
FIG. 1 is a schematic diagram showing details of a dual input clutch powershift transmission.

Referring now to the drawings, there is illustrated in FIG. 1 a dual dry clutch powershift transmission 10 including a first dry input clutch 12, which selective connects the input 14 of transmission 10 alternately to the even-numbered gears 16 associated with a first layshaft 18, and a second dry input clutch 20, which selective connects the input 14 alternately to the odd-numbered gears 22 associated with a second layshaft 24.

Input 14 is driveably connected to a power source such as an internal combustion engine or an electric motor. An electronic transmission control module (TCM) controls the input clutches 12, 20 through command signals sent to solenoid-actuated servos, which actuate the input clutches. The TCM includes a microprocessor accessible to electronic memory and containing control algorithms expressed in computer code, which are executed repeatedly at frequent intervals.

Shaft 18 supports pinions 26, 28, 30, which are each journalled on shaft 18, and couplers 32, 34, which are secured to shaft 18. Pinions 26, 28, 30 are associated respectively with the second, fourth and sixth gears. Coupler 32 includes a sleeve 36, which can be moved leftward to engage pinion 26 and driveably connect pinion 26 to shaft 18. Coupler 34 includes a sleeve 38, which can be moved leftward to engage pinion 28 and driveably connect pinion 28 to shaft 18. Sleeve 38 can be moved rightward to engage pinion 30 and driveably connect pinion 30 to shaft 18.

Shaft 24 supports pinions 40, 42, 44, which are each journalled on shaft 24, and couplers 46, 48, which are secured to shaft 24. Pinions 40, 42, 44 are associated respectively with the first, third and fifth gears. Coupler 46 includes a sleeve 50, which can be moved leftward to engage pinion 40 and driveably connect pinion 40 to shaft 24. Coupler 48 includes a sleeve 52, which can be moved leftward to engage pinion 42 and driveably connect pinion 42 to shaft 24. Sleeve 52 can be moved rightward to engage pinion 44 and driveably connect pinion 44 to shaft 24.

Output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46 and 48 may be synchronizers, or dog clutches or a combination of these.

Figure 2:
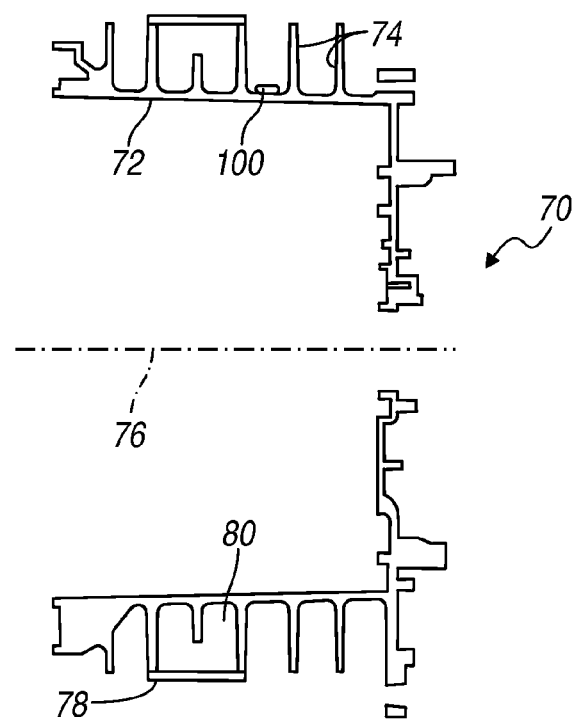
FIG. 2 is cross sectional view of a bell housing that contains the dual dry input clutches of FIG. 1.

FIG. 2 illustrates a bell housing 70 formed with a shell 72, in which input clutches 12, 20 are located, and fins 74 extending radial from an axis 76, which is coaxial with input 14 and output 54. At least two fins 74 are interconnected at their radial outer edge by a cylindrical shell 78, which forms an annular air jacket or duct 80.

Figure 3:
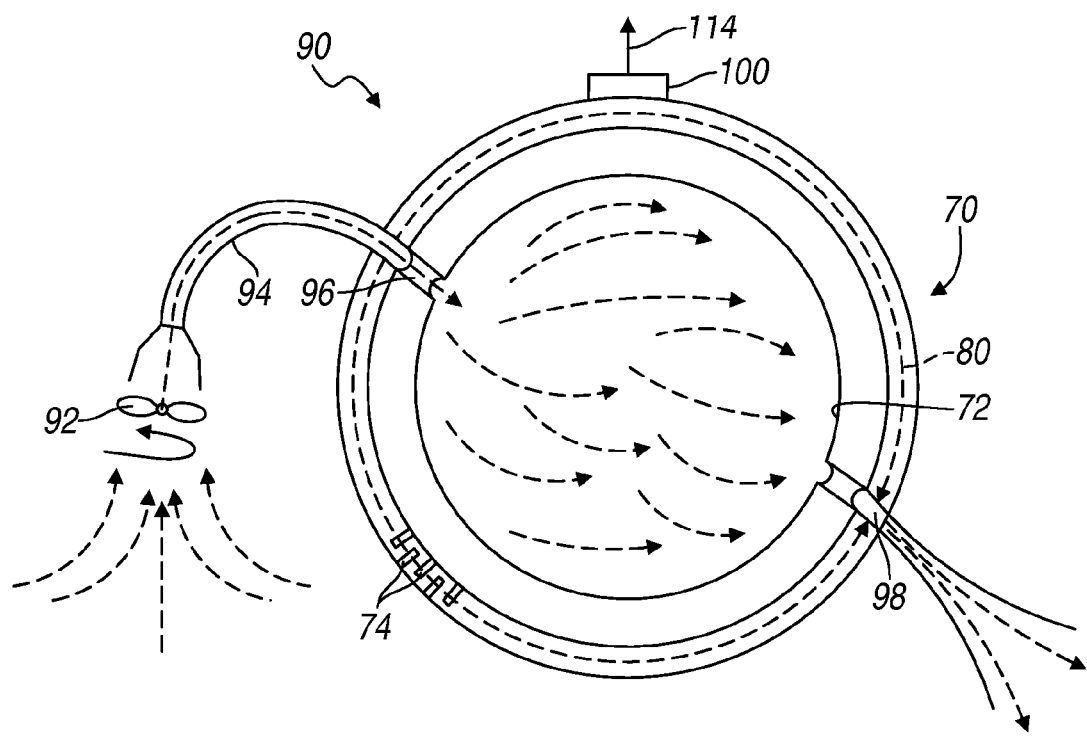
FIG. 3 is a schematic diagram showing a system for cooling dual dry input clutches of FIG. 1 located in the bell housing of FIG. 2.

FIG. 3 is a schematic diagram showing a system 90 for cooling the dual dry input clutches 12, 20 and the bell housing 70. A fan 92 forces incoming ambient air through an inlet 94 to a splitter 96, which direct a portion of the incoming air across the interior of the bell housing 70 and over the surfaces of the clutches 12, 20 to an outlet 98. A residual portion of the incoming air is directed by the splitter 96 into external ducting 80, in which fins 74 are located. Air exits the duct 80 through outlet 98 and is returned to the ambient atmosphere.

Empirical data obtained by bench testing, which simulates in-service operation of clutches 12, 20, is used to correlate the temperature indicated by a thermocouple 100 on the bell housing 70 and the temperature of the critical surfaces 102, 104 of the input clutches 12, 20, respectively, and surfaces about 4 mm below the clutch surfaces 102, 104. In this way, data produced by thermocouple 100 is a reference from which the temperature of the critical clutch surfaces 102, 104 can be inferred.

FIG. 1 show a transmission control unit (TCU) 106, which controls operation of fan 92 in accordance with a control algorithm expressed in computer code, stored in electronic memory and executed by a microprocessor incorporated in the TCU. An electric motor 108 activates and deactivates fan 92 in response to electric power carried on line 110 from a source of electric power 112 to the motor 108 subject to a switching function provided by the TCU 106 in accordance with the algorithm.

Figure 4:
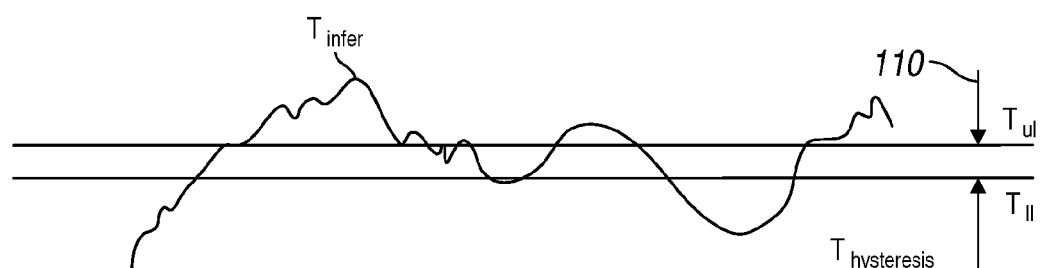
FIG. 4 is a graph showing the variation of the inferred clutch temperature and a hysteresis temperature band.

FIG. 4 graphically illustrates the variation of the clutch temperature $T_{infer}$ at clutch surfaces 102, 104 as inferred from an electronic signal 114 produced by thermocouple 100 and transmitted as input to TCU 106. The graph shows an upper limit temperature $T_{ul}$, a lower limit temperature $T_{ll}$ and a hysteresis temperature band 110 between the upper and lower limits to avoid cycling the fan 92 around a set temperature.

Figure 5:
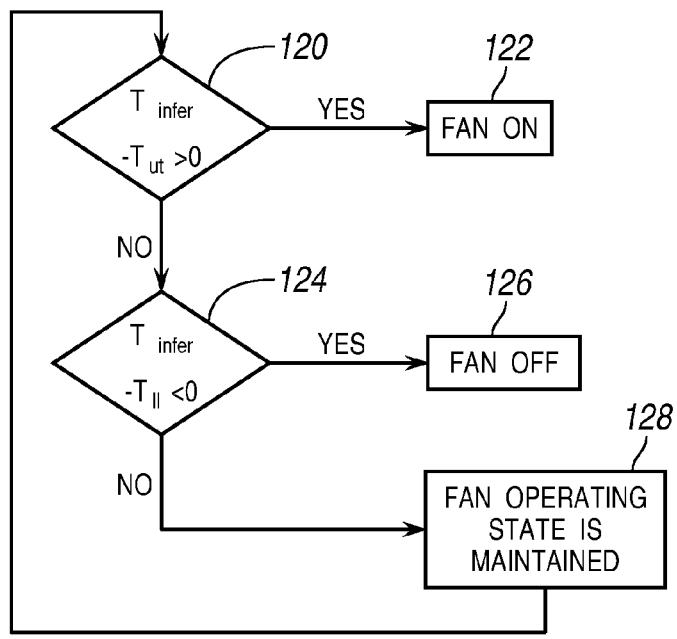
FIG. 5 is a diagram of an algorithm for controlling operation of a fan that reduces the clutch temperature.

FIG. 5 is a diagram of the algorithm that controls operation of fan 92. At step 120 a test is made to determine whether the difference between the inferred clutch temperature $T_{infer}$ and the upper limit temperature $T_{ul}$ is greater than zero. If the result of test 120 is logically true, at step 122, fan 92 is turned on by the TCU 106 electrically connecting the power source 112 and the electric motor 110.

If the result of test 120 is logically false, the control algorithm advances to step 124 where a test is made to determine whether the difference between the inferred clutch temperature $T_{infer}$ and the lower limit temperature $T_{ll}$ is less than zero. If the result of test 124 is logically true, at step 126, fan 92 is turned off by the TCU 106 electrically disconnecting the power source 112 and the electric motor 110.

If the results of tests 120 and 124 are both logically false indicating that the inferred clutch temperature $T_{infer}$ is in the hysteresis band 110, the control algorithm advances to step 128 where the operating state of fan 92 is maintained unchanged, whereupon the algorithm returns to step 120 and is re-executed.

Instead of using temperature data from thermocouple 100 as a reference from which the temperature of the critical clutch surfaces 102, 104 can be inferred, an alternate technique, described with reference to FIGS. 6 and 7, can be used to infer that temperature.

Input information supplied to the TCU 106 includes engine speed and engine torque 130 transmitted to input 14 from an engine or other power 132 source driveably connected to the input 14. An engine control module (ECM) 133 monitors engine speed and repeatedly at frequent intervals determines from engine operating variables the magnitude of torque produced by the engine 132. The speed and torque 134 transmitted by output 54 of transmission 10 to the driven wheels 136 is input repeatedly at sampling intervals to the TCU 106.

Additional input information 138 supplied to the TCU 106 repeatedly at sampling intervals includes the specific heat of the clutches 12, 20, the rate of heat convection from the clutches, and the weight and thermal conductivity of the clutches. Further input information 140 supplied to the TCU 106 repeatedly at sampling intervals includes the ambient temperature, coefficient of friction (COF) of the clutch surfaces 102, 104, and initial temperature of the clutches.

Figure 6:
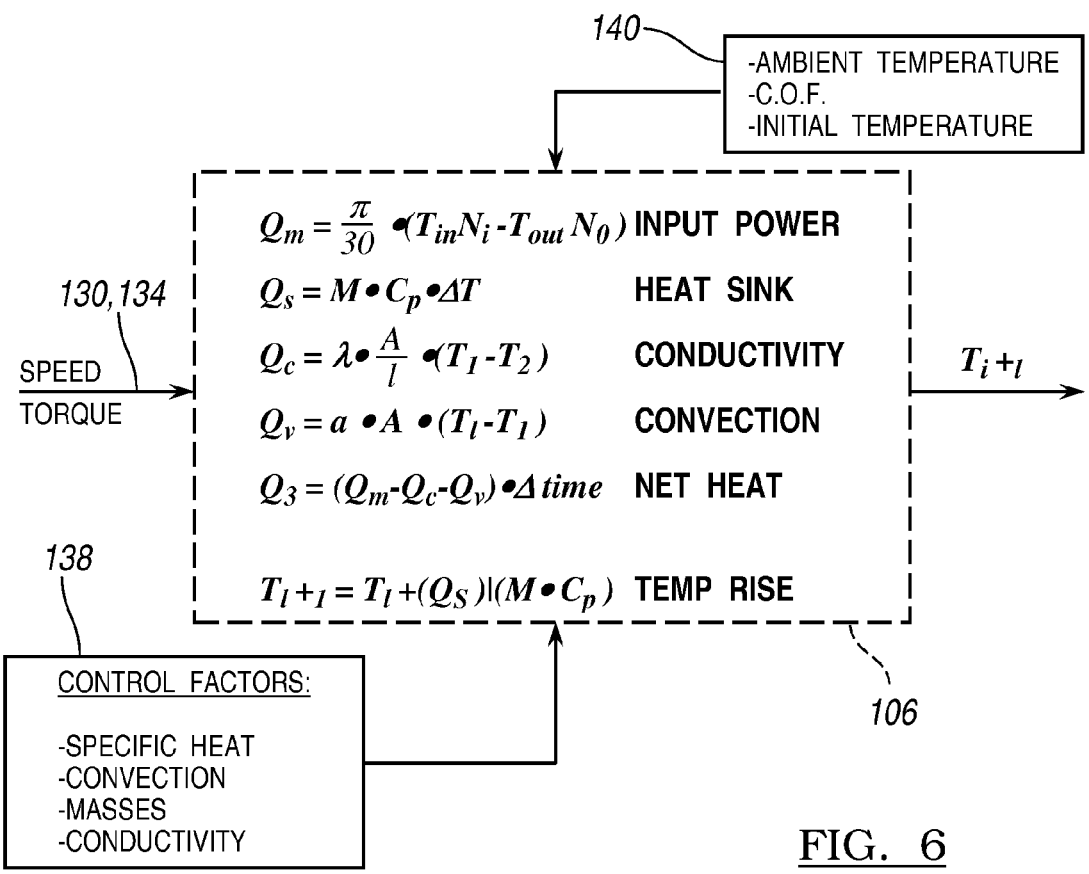
FIG. 6 is schematic diagram showing a TCU, input information supplied as input, and equations used to determine an inferred temperature.
Figure 7:
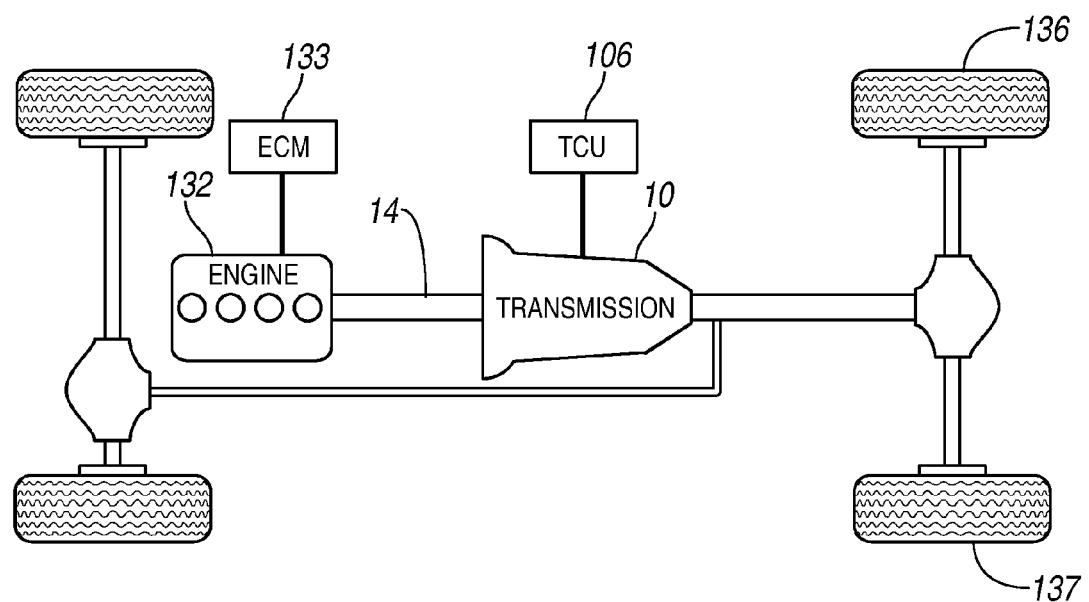
FIG. 7 is a schematic diagram of a vehicle powertrain that includes an engine and a dual clutch powershift transmission.

As FIG. 6 shows, TCU 106 uses these input data and information stored in electronic memory to calculate the rate of change of rotating power absorbed by the clutches 12, 20 due to clutch input power ($Q_{in}$); the magnitude of heat energy absorbed by the clutches ($Q_s$) due to a change of clutch temperature $\Delta T$; the rate at which heat energy is carried from the critical surfaces 102, 104 of the clutches by conduction ($Q_c$) due to a temperature difference ($T_1-T_2$); the rate at which heat energy is carried from the critical surfaces 102, 104 of the clutches by convection ($Q_v$) due to a temperature difference ($T_1-T_2$); the net heat change at the critical surfaces of the clutches ($Q_s$) during a period whose length is $\Delta$time; and the change in the inferred temperature at the critical surfaces of the clutches during a sampling interval ($T_{i+1}$).

M is the symbol for mass, Lambda for conductivity, A for convective area, l for length of the conductive element, and Alpha for heat transfer coefficient. Power expressed in watts is $$\text{Power}=T_{slip}*(N_{in}-N_{out})*\pi/30$$

The algorithm illustrated in FIG. 5 that controls operation of fan 92 is used to actuate the fan when the inferred temperature of the critical surfaces 102, 104 is determined as described with reference FIG. 6. At step 120 a test is made to determine whether the difference between the inferred clutch temperatures $T_{i+1}$ and the upper limit temperature $T_{ul}$ is greater than zero. If the result of test 120 is logically true, at step 122, fan 92 is turned on by the TCU 106 electrically connecting the power source 112 and the electric motor 110.

If the result of test 120 is logically false, the control algorithm advances to step 124 where a test is made to determine whether the difference between the inferred clutch temperatures $T_{i+1}$ and the lower limit temperature $T_{ll}$ is less than zero. If the result of test 124 is logically true, at step 126, fan 92 is turned off by the TCU 106 electrically disconnecting the power source 112 and the electric motor 110.

If the results of tests 120 and 124 are both logically false indicating that the inferred clutch temperature $T_{i+1}$ is in the hysteresis band 110, the control algorithm advances to step 128 where the operating state of fan 92 is maintained unchanged, whereupon the algorithm returns to step 120 and is re-executed.

In accordance with the provisions of the patent statutes, the preferred embodiment has been described. However, it should be noted that the alternate embodiments can be practiced otherwise than as specifically illustrated and described.

The invention claimed is:

1. A system for controlling temperature of a clutch that transmits power from a power source to transmission gearing, comprising:
    a housing containing the clutch;
    a fan for circulating air through the housing and over the clutch;
    a controller configured to determine an inferred temperature at a reference surface on the clutch, access a lower limit temperature, and turn the fan off if the inferred temperature is less than the lower limit temperature.

2. The system of claim 1 wherein the controller is further configured to determine an initial temperature, to calculate a net magnitude of mechanical power input to the clutch assembly, to calculate an inferred temperature change at the reference surface in response to the net magnitude of mechanical power input to the clutch assembly, and to determine an inferred temperature in response to the inferred temperature change.

3. The system of claim 1 wherein the controller is further configured to access an upper limit temperature, to compare the inferred temperature to the upper limit temperature, and to turn the fan on if the inferred temperature is greater than the upper limit temperature.

4. The system of claim 1 wherein the controller is further configured to access an upper limit temperature and a lower limit temperature, to compare the inferred temperature to the upper and lower limit temperatures, and to maintain a current operating state of the fan if the inferred temperature is greater than the lower limit temperature and less than the upper limit temperature.

5. A method for controlling temperature of a clutch comprising the steps of:
    (a) providing a housing containing a dual input clutch;
    (b) providing a fan for circulating air through the housing;
    (c) determining an inferred temperature on a surface of the clutch within the housing;
    (d) turning the fan on if the inferred temperature is greater than a upper limit temperature and turning the fan off if the inferred temperature is less than a lower limit temperature.

6. The method of claim 5 wherein step (d) further comprises turning the fan on if the inferred temperature is greater than a upper limit temperature and turning the fan off if the inferred temperature is less than a lower limit temperature; and
    maintaining a current operating state of the fan if the inferred temperature is greater than the lower limit temperature and less than the upper limit temperature.

7. The method of claim 5 wherein step (c) further comprises:
    determining an initial temperature;
    calculating a temperature change on the clutch resulting from a change of rotating power applied to the clutch due to slip across the clutch during an interval;
    determining the inferred temperature using the initial temperature and the temperature change; and
    turning the fan on if the inferred temperature is greater than an upper limit temperature and turning the fan off if the inferred temperature is less than a lower limit temperature.

8. The method of claim 5 further wherein step (c) further comprises:
    determining an initial temperature;
    calculating a temperature change on the clutch resulting from a change of rotating power applied to the clutch due to slip across the clutch during a interval and heat removed from the clutch during the interval;
    determining the inferred temperature using the initial temperature and the temperature change;
    turning the fan on if the inferred temperature is greater than an upper limit temperature and turning the fan off if the inferred temperature is less than a lower limit temperature.

9. The method of claim 5 further wherein step (c) further comprises determining an inferred temperature at a reference surface on the clutch at which an input is connected to a layshaft.

* * * * *